United States Patent Office 3,445,312
Patented May 20, 1969

3,445,312
METHOD FOR MAKING LAMINATED
STRUCTURES
Osborne Lawrence Rider, Baltimore, Md., assignor to
FMC Corporation, New York, N.Y., a corporation of
Delaware
No Drawing. Filed May 28, 1965, Ser. No. 459,916
Int. Cl. C09j 3/00
U.S. Cl. 156—332        5 Claims

ABSTRACT OF THE DISCLOSURE

This specification discloses a method for the preparation of laminated structures which comprises coating a substrate with a film of a diallyl phthalate coating composition containing a polymerization inhibitor and a catalyst, laying over the coated substrate a fibrous sheet of reinforcing material and thereafter subjecting the composite assembly to laminating pressure at a temperature and for a time sufficient to activate the catalyst and convert the resin in the film to a thermoset condition.

---

Decorated laminated sheets are generally prepared from a base structure, which may be hardboard or some other inexpensive base material. The board is then decorated, as by adhering thereto a printed decorative paper, or a natural wood veneer, or by coating with a ground coat and printing a design on the ground coat. Thereafter, there is laid over the decorated board a fibrous overlay sheet which is impregnated with thermosetting resin, and the sheet is then adhered to the base by heat and pressure, which thermosets the resin in the overlay sheet to produce the final laminated structure.

Laminated structures of this type are made with various sorts of heat converting resins. Most of these, like melamine-formaldehyde resins, require high pressures in laminating, so that it is difficult to get satisfactory results with wood veneer laminates. The diallyl phthalate decorated laminates have the advantage that they can be cured at relatively low pressure, so that wood veneer decoratives can be used as well as printed decorated paper and printed ground costs.

The use of resin impregnated fibrous overlay sheets has heretofore been considered to be essential in the production of laminated decorated board. A rather thick film of resin is required to produce a wear-resistant product; and such films tend to crack due to internal stresses unless they are enforced by the fiber.

The use of impregnated fibrous overlay sheets presents definite problems to the producer of laminated decorated sheets. One disadvantage is that there is a tendency for solvent to be trapped in the overlay sheet, with resultant blemishes in the finished film, particularly in low pressure laminating, and extreme care must be taken to guard against this, with added cost in the processes. Moreover, very light papers or fabrics cannot be used, since the sheets need sufficient strength to be handled through a saturating bath and the drying oven used for removing solvent. This requirement forces the use of thicker paper or fabric than is required to reinforce the film of plastic, with the resultant undesirable cost penalty.

It is the principal object of this invention to overcome the disadvantages of presaturating fibrous reinforcements.

I have discovered a diallyl phthalate overlay composition which can be applied directly to a base as by spraying; and unsaturated fibrous reinforcement can be laid on top of the coated base, and improved laminates can be produced by conventional low pressure, moderate temperature laminating procedure. The resultant product has all the advantages of conventional diallyl resin decorated laminates made with presaturated resin impregnated overlay sheets, with the advantages of lower cost due to elimination of the saturation cost and the reduction in paper weight.

The cost saving is rather substantial, in that conventional overlay sheets have a basis weight of about 18 to 20 lbs. per 3,000 square feet, whereas the paper preferably used in accordance with my invention will have basis weights of the order of 5 to 10 lbs. per 3,000 square feet. The fiber in such a thin paper is more than sufficient to give the necessary reinforcement to the resin film; moreover, because there is less fiber, the resultant laminated structures have somewhat superior clarity than heretofore known laminated sheets.

The novel compositions of this invention comprise from about 90 to 99 parts by weight of diallyl phthalate prepolymer with from about 1 to 10 parts by weight of monomeric diallyl phthalate, appropriate amounts of a polymerization catalyst, a mold release agent if desired, and from about .0025 to .025 part of a polymerization inhibitor. The composition is then reduced to application viscosity with a solvent such as acetone, or other volatile solvent.

The diallyl phthalate prepolymer may be prepared from any of the diallyl phthalates, i.e. the diallyl esters of orthophthalic, isophthalic or terephthalic acids.

These polymers may be prepared by standard polymerization techniques, such as emulsion, solution or bulk polymerization, usually with a peroxide catalyst, as described by Pollack et al. in U.S. Patent No. 2,273,891.

As the diallyl phthalate polymerization reaction is allowed to proceed, the viscosity of the medium increases slowly at first, and then rapidly as the gel-point of the polymer is approached. The reaction is terminated before gelation has occurred, normally at about 25–35% conversion of monomer to partial polymer. The polymerization may be terminated by any standard procedure such as lowering the temperature, adding a solvent for the monomer which precipitates the partial polymer, or adding a polymerization inhibitor. The product of this polymerization is a solution containing partial polymer dissolved in monomer. The partial polymer is separated from monomer and residual solvent by known procedures, such as by stripping off volatile components, or dissolving the monomer in an appropriate solvent.

Diallyl phthalate partial polymers are linear or slightly branched, solid polymers containing residual unsaturation. The number average molecular weight of the partial polymer is generally less than about 25,000 and usually below about 10,000. These partial polymers are normally characterized by their precipitated polymer viscosity which is measured as a 25% solution of partial polymer in diallyl phthalate monomer at 25° C. The precipitated polymer viscosity is generally in the range of about 100–1,000 centipoises, and preferably 200–700 centipoises.

The monomer corresponding to the partial polymer is used to govern the degree of viscosity of the composition during the laminating procedure, the higher the amount of monomer the lower the viscosity.

As indicated above, a polymerization catalyst in the form of an organic peroxide is used to catalyze the final cure of the resin; from about ¼% to about 7% by weight of peroxide of dry composition is used. Preferably the peroxide is present from about 2 to 3% by weight. Useful peroxides include diacyl peroxides such as benzoyl peroxide, p-chlorobenzoyl peroxide, 2,4-dichlorobenzoyl peroxide, lauroyl peroxide and succinic acid peroxide, dialkyl peroxides such as dicumyl peroxide and di-tert.-butyl peroxide, ketone and aldehyde peroxides such as methyl ethyl ketone peroxide, cyclohexanone peroxide and hydroxyheptyl peroxide, hydroperoxides such as tert.-butyl hydroperoxide, p-menthane hydroperoxide, pinane hydroperoxide, cumene hydroperoxide and 2,5-dimethylhexane-2,5-dihydroperoxide, peroxy esters such as tert.-butyl perbenzoate, 2,5-dimethylhexane 2,5-di(peroxybenzoate), di-tert.-butyl diperphthalate, tert.-butyl peracetate, tert.-butyl peroxyisobutyrate and isopropyl percarbonate, as well as many other organic peroxides which have been described in the literature.

Preferably, the impregnating solution also contains about 2 to 5% by weight, based on the resinous component, of an internal release agent such as lauric acid, carnauba wax or beeswax. However, external release agents or other processing techniques may also be used instead of an internal release agent.

My compositions differ from conventional compositions used for impregnating overlay sheets in that they can contain very small amounts of polymerization inhibitors, sufficient to delay the onset of polymerization for just long enough to permit the resin film to soften and merge with the reinforcing sheet, without unduly delaying the overall course of polymerization. The amount needed depends on the particular polymerization inhibitor used. With the most commonly used inhibitors, hydroquinone and p-tertiary butyl catechol (both dioxygenated aromatics) from about .0025 to about .025% may be used, and the same range is useful with other inhibitors showing the same general activity. Other useful inhibitors include p-benzoquinone, anthraquinone, mono-tert.-butyl hydroquinone, 2-5 di-phenyl p-benzoquinone, propyl gallate and various polyalkylated phenols. In fact, any of the known polymerization inhibitors appear to be useful, in the same range of activity as .0025 to .025% of hydroquinone.

As indicated above, a solvent is used to prepare the composition for application. Useful solvents include, among others, low molecular weight ketones such as acetone, methyl ethyl ketone and methyl isobutyl ketone, aromatics such as benzene, toluene, xylene and isopropyl benzene and esters such as ethyl acetate and butyl acetate. The solvents must be low boiling enough so they can be evaporated from the film at temperatures low enough not to polymerize the resin.

The invention may be carried out with any of the conventional base core structures of the prior art, which include hardboard, particle board, plywood, lumber core, flake board, resin-saturated papers and cement-asbestos board. Where the base structure is not sufficiently decorative in itself, it may be covered with a coating, which may be monotone or decorated as desired by printing, or a printed decorated sheet may be used to provide the decoration on the surface of the core material.

In carrying out the invention the decorated base is coated with a solution of the resin, preferably by spray application, and the coated base is passed through a low temperature oven to drive off solvent. The drying temperature should be under that at which the resin system heat converts; temperatures of the order of 150–250° F. can be used, with temperatures of about 200–225° F. being preferable. Sufficient resin coating is provided so that when it is combined with the overlay sheet there will be a minimum of about 62% resin coating and a maximum of about 90% in the merged top coat. The more porous the substrate, the higher is the percentage of resin coating desirable, and I prefer to operate in the 80–90% range.

The overlay sheet used is most preferably an unwoven sheet made from a major portion of polymeric fibers of the polyacrylonitrile type, as more fully discussed in the Kelley et al. U.S. Patent Application 185,517, filed Apr. 6, 1962, now Patent No. 3,208,901. However, where higher ratios of resin are used of the order of 85–90%, satisfactory clarity can be obtained using conventional alpha cellulose or rayon sheets.

As indicated above the principal advantage of my invention is its ability to use low basis weight papers. Where preimpregnated papers must be at least 18–20 lbs. basis weight (lbs. per 3,000 ft.) the paper used in this invention can be much thinner, and 5 to 10 lb. basis weight papers are much satisfactory. Obviously, I can use heavier papers as well; the only criteria for what paper can be used is the selection of the proper weight of paper vis-a-vis the weight of resin in the film, to produce the proper ratio of resin in the final laminate.

Laminating is done at temperatures and pressures and for a time sufficient to convert the resin to the thermoset condition. Pressures need not be high, and can range from little more than contact pressure to about 450 p.s.i. In general, pressures of 100–300 p.s.i. have proved most useful.

The temperaure used must be high enough to activate the catalyst, and preferably is somewhat higher to increase the rate of cure, thereby permitting higher production rates. In general, temperatures range from about 225–375° F., depending on the core material and the catalyst. I prefer to operate in the 275–350° F. range, with temperatures somewhat above the activation temperature of the catalyst. For example, with tertiary butyl peroxide, which has an activation temperature of about 280° F., I prefer to operate at 330° F., whereas with dicumyl peroxide, which has an activation temperature of about 300° F., I preferably operate at 340° F. Laminating times as short as about 5 minutes are obtained when operating in this range, well above activation temperature. However, I prefer cures in the 15 minute range.

The following examples are presented as illustrative of the invention, without any intention that it be limited thereto. All parts and percentages are by weight unless otherwise indicated.

Example 1

A typical diallyl phthalate partial polymer was prepared as follows: 8,860 lbs. of diallyl ortho-phthalate monomer, 622 lbs. of isopropanol (91% by vol.) and 75 lbs. of hydrogen peroxide (50.5% $H_2O_2$) were charged to a 1,500 gal. stainless steel reactor, thoroughly agitated and heated to a pot temperature of 104–108° C. at total reflux. After 10 hrs. the viscosity of the reaction mixture had increased to 27 c.p.s. at 106° C., as measured by a Bendix Ultraviscoson computator. The batch was cooled, to obtain a reaction product having a viscosity of 425 c.p.s. at 25° C. This polymeric reaction product, which consists of 27% partial polymer, 67% unreacted monomer and 6% isopropanol, was mixed intimately with 48,000 lbs. of isopropanol (91% by vol.), and the partial polymer precipitated at 0° C. The solid polymer was separated by filtration and dried, to yield a 27.6% conversion of monomer to polymer. The properties of the partial polymer obtained by this process were:

| | |
|---|---:|
| PPV, c.p.s. at 25° C. | 354 |
| Softening range, ° C. | 80–105 |
| Iodine No. | 55 |
| Sp. gr. at 25° C. (ASTM D 792–50) | 1.267 |

The PPV given above is the precipitated polymer viscosity of a 25% solution of polymer in monomer at 25° C.

A composition was made of this resin as follows:

| | Parts |
|---|---:|
| Diallyl phthalate prepolymer | 93 |
| Diallyl phthalate monomer | 7 |
| Tertiary butyl perbenzoate | 3 |
| Hydroquinone | 0.0075 |
| Lauric acid | 3 |
| Acetone | 100 |

The coating was applied by spray application at the rate of 9 grams of resin solids per square foot to a number of substrates and the substrates were dried at 220° F. One of the substrates was a ⅛ inch thick tempered hardboard (Masonite lignocellulose) coated with a 1 to 2 mil thick mahogany ground coat, overprinted with a mahogany wood pattern. A second base coat consisted of a .75 inch walnut veneered particle board which had been predried 10 minutes at 320° F. A third base consisted of a 5 mil thick, resin impregnated, printed, decorated paper laminated to the ⅛″ thick lignocellulose hardboard. In each case the overlay sheet used was 10 pound base weight non-woven acrylic fiber, in which the polymer forming units were 95% acrylonitrile and 5% nitropyridine, with the fibers 1.25 inches long and 3 denier. The layup in each case consisted of a slip caul followed by a sheet of glassine separator, a sheet of phenolic-impregnated kraft paper as a balancing sheet, the base board, the overlay sheet, and a polished aluminum caul plate. The layup was laminated in a flat bed press at 200 p.s.i. for 15 minutes at a platen temperature of 330° F. In each case excellent results were obtained.

Example 2

A composition was made as follows:

| | Parts |
|---|---|
| Prepolymer of Example 1 | 93 |
| Diallyl phthalate monomer | 7 |
| Dicumyl peroxide | 3 |
| p-Tertiary butyl catechol | .0075 |
| Lauric acid | 3 |
| Acetone | 100 |

The coating was applied as in Example 1 to the mahogany ground coated and decorated tempered hardboard of Example 1 using the same overlay sheet and layup as in Example 1 except that the kraft backing sheet was omitted. Lamination was for 15 minutes at 200 p.s.i. and at a platen temperature of 340° F. Excellent results were again obtained.

A balancing sheet is essential with conventional saturated overlay sheets on their substrates, because otherwise the laminates tend to curl due to the action of the overlay sheet, With the very thin overlay sheets made possible by the use of this invention, the balancing sheet may be omitted without danger of curling.

I claim:

1. A method of producing a laminated structure which comprises coating a substrate with a film of a composition consisting essentially of a clear mixture of diallyl phthalate prepolymer and diallyl phthalate monomer, 90–99% of which is prepolymer, an effective amount of an organic peroxide polymerization catalyst therefor, and a polymerization inhibitor in amount sufficient to delay onset of polymerization but insufficient to prevent polymerization, and corresponding in effective amount to .0025% to .025% by weight of hydroquinone, based on diallyl phthalate, laying over the coated substrate a fibrous sheet of reinforcing material in such thickness relevant to the coating that the weight of the coating represents from 62 to 90% of the combined weights of the coating and reinforcement, and thereafter subjecting the composite assembly to laminating pressure at a temperature and for a time sufficient to activate the catalyst and convert the resin in the film to a thermoset condition, whereby the reinforcing sheet merges with the film of coating before it is thermoset to produce a reinforced laminated structure.

2. The method of claim 1 in which the polymerization inhibitor is hydroquinone.

3. The method of claim 1 in which the polymerization inhibitor is p-tertiary butyl catechol.

4. The method of claim 1 in which the coating comprises 80 to 90% of the combined weights of coating and reinforcement.

5. The method of claim 1 in which the reinforcing sheet is a non-woven paper of 5 to 10 lbs. basis weight.

References Cited

UNITED STATES PATENTS

| 2,443,740 | 6/1948 | Kropa. | |
|---|---|---|---|
| 2,990,388 | 6/1961 | Johnston et al. | 260—78.4 XR |
| 3,131,088 | 4/1964 | Festag | 117—161 |
| 3,208,901 | 9/1965 | Kelley et al. | 161—151 |

ROBERT F. BURNETT, *Primary Examiner.*

WILLIAM A. POWELL, *Assistant Examiner.*

U.S. Cl. X.R.

161—6, 151, 232, 263, 413; 260—78.4